(No Model.)
J. F. SMITH.
VEHICLE.
No. 280,870. Patented July 10, 1883.
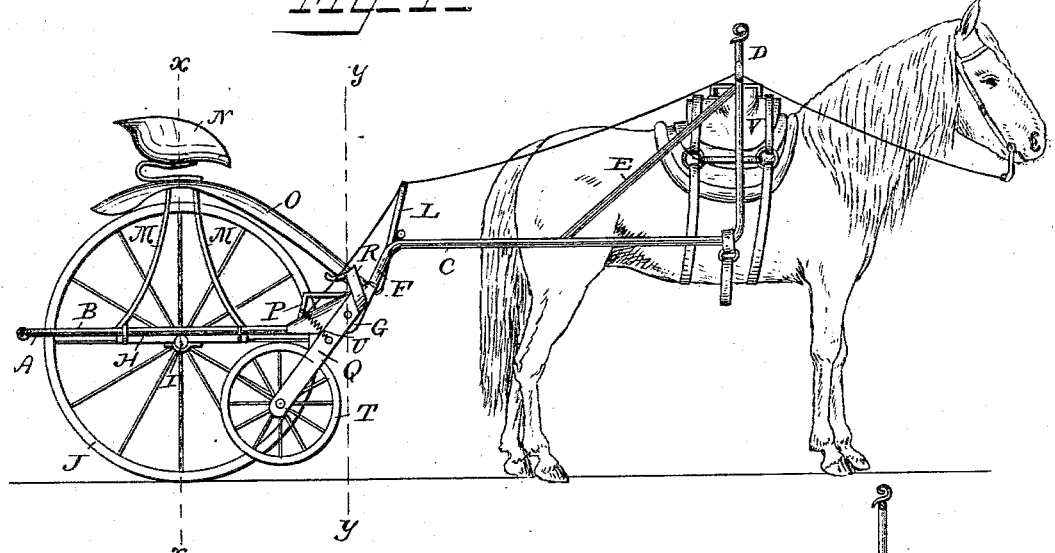
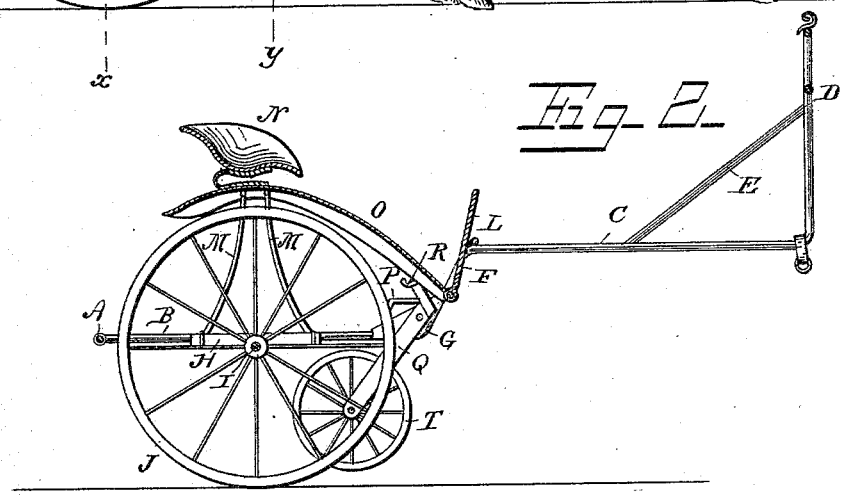
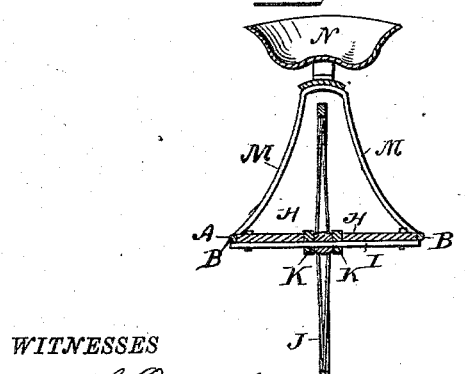
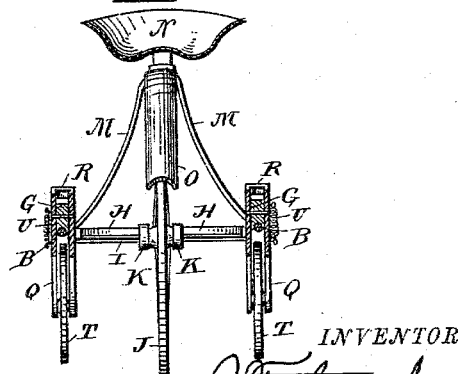
WITNESSES
INVENTOR

UNITED STATES PATENT OFFICE.

JAMES F. SMITH, OF TERRELL, TEXAS.

VEHICLE.

SPECIFICATION forming part of Letters Patent No. 280,870, dated July 10, 1883.

Application filed February 12, 1883. (No model.)

*To all whom it may concern:*

Be it known that I, JAMES F. SMITH, a citizen of the United States, residing at Terrell, in the county of Kaufman and State of Texas, have invented a new and useful Vehicle, of which the following is a specification, reference being had to the accompanying drawings.

This invention relates to road-vehicles of that class which are supported mainly upon a single wheel; and it consists in certain improvements in the construction of the same, which will be hereinafter fully described, and particularly pointed out in the claims.

In the drawings hereto annexed, Figure 1 is a side view of my improved road-vehicle. Fig. 2 is a longitudinal vertical sectional view of the same. Fig. 3 is a vertical transverse section on the line $x\ x$ in Fig. 1, and Fig. 4 is a vertical transverse section on the line $y\ y$ in Fig. 1.

The same letters refer to the same parts in all the figures.

A in the drawings refers to the frame of my improved vehicle, which is made, preferably, of iron tubing, which is light, inexpensive, and durable. The sides B B of the frame are extended in front, so as to form the thills or shafts C C, the front ends of which are connected by the yoke D. Braces E E connect the latter with the thills, as shown. The front ends of the sides B B of the frame are curved upwardly at F, forming angular recesses, in which angle plates or irons G are secured. The sides of the frame have boxes or bearings H H for the axle I, which carries the wheel J. Upon the axle, adjoining the hub of said wheel, are placed washers K K, which serve to take the strain off the axle when the vehicle is traveling over the road. Any suitable light and strong wheel may be used.

L is a dash-board or guard secured to the parts F F of the frame.

M M are braces or uprights connected to the sides and supporting the seat N, which may be mounted upon a suitable spring. A wheel fender or guard, O, is secured to the upper ends of the uprights M and to the lower edge of the dash-board L, as shown.

P P are foot-rests secured to the angle-plates G, and above the said foot-rests are pivoted brackets Q Q, having foot-pieces or treadles R at their upper ends, and carrying small wheels T, which are kept off the ground by springs U, suitably arranged.

The harness used in connection with my improved vehicle consists, essentially, of an ordinary gig-saddle, V, to which the yoke D is pivotally connected. Traces and a breast-collar may, however, be used, especially when long distances are to be traveled.

The operation of my invention will be readily understood from the foregoing description, taken in connection with the drawings hereto annexed. When the vehicle is first started, the rider will press the treadles R R, so as to hold the wheels T T in contact with the ground. When sufficient speed has been acquired the treadles are released, and the springs U will then raise the wheels T from contact with the ground, and the momentum will then be sufficient to keep the wheel erect. Should it be inclined to tilt, it may easily be righted by pressing either treadle so as to throw the wheel T on the tilting side in contact with the ground.

My improved vehicle is simple, light, and convenient. It will follow in the track of the horse, and may be used wherever travel on horseback is possible.

I claim as my invention and desire to secure by Letters Patent of the United States—

1. The combination, with the frame having side pieces turned upwardly at their front ends, of the angle-irons having the pivoted brackets carrying guide-wheels, springs arranged to keep the said wheels off the ground, and the treadles and foot-rests, as set forth.

2. The combination of the frame having upturned sides extending forwardly so as to form the thills, connected by a yoke, the axle carrying a single wheel, the pivoted brackets having the guide-wheels, springs for keeping the latter off the ground, the dash-board secured to the upturned sides of the frame, the uprights supporting the seat, and the fender secured to said uprights and to the lower edge of the dash-board, as and for the purpose set forth.

In testimony that I claim the foregoing as my own I have hereto affixed my signature in presence of two witnesses.

JAMES FRANKLIN SMITH.

Witnesses:
WM. H. ALLEN,
GEO. A. NELSON.